US008195055B2

(12) United States Patent
Vieira et al.

(10) Patent No.: US 8,195,055 B2
(45) Date of Patent: Jun. 5, 2012

(54) HIGH DYNAMIC RANGE APD OPTICAL RECEIVER FOR ANALOG APPLICATIONS

(75) Inventors: Amarildo C. Vieira, Philadelphia, PA (US); Ihab E. Khalouf, Bethlehem, PA (US)

(73) Assignee: General Instrument Corporation, Horhsam, PA (US)

( * ) Notice: Subject to any disclaimer, the term of this patent is extended or adjusted under 35 U.S.C. 154(b) by 270 days.

(21) Appl. No.: 12/650,937

(22) Filed: Dec. 31, 2009

(65) Prior Publication Data
US 2011/0158656 A1   Jun. 30, 2011

(51) Int. Cl.
*H04B 10/06* (2006.01)
(52) U.S. Cl. .................. 398/202; 398/206; 398/207
(58) Field of Classification Search .......... 398/202–214
See application file for complete search history.

(56) References Cited

U.S. PATENT DOCUMENTS

| 4,805,236 | A |   | 2/1989 | Urala |            |
|-----------|---|---|--------|-------|------------|
| 5,812,572 | A | * | 9/1998 | King et al. | 372/38.04 |
| 6,313,459 | B1 |  | 11/2001 | Hoffe et al. |         |
| 6,852,966 | B1 | * | 2/2005 | Douma et al. | 250/214 AG |
| 7,215,721 | B2 |  | 5/2007 | Hietala et al. |       |
| 7,224,908 | B2 | * | 5/2007 | Alwan et al. | 398/197 |
| 7,427,741 | B2 |  | 9/2008 | Koiwai et al. |        |
| 2002/0057480 | A1 | | 5/2002 | Ushiyama |           |
| 2004/0253003 | A1 | * | 12/2004 | Farmer et al. | 398/214 |
| 2009/0194675 | A1 |  | 8/2009 | Ichino et al. |        |

FOREIGN PATENT DOCUMENTS

WO   98/00943 A1   1/1998

OTHER PUBLICATIONS

Naresh Chand et al., "Delivery of Digital Video and Other Multimedia Services (> 1 Gb/s Bandwidth) in Passband above the 155 Mb/s Baseband Services on a FTTx Full Service Access Network", Journal of Lightwave Technology, vol. 17, No. 12, Dec. 1999, pp. 2449-2460.
Tran Van Muoi, "Receiver Design for High-Speed Optical-Fiber Systems", Journal of Lightwave: Technology. vol. LT-2, No. 3., Jun. 1984, pp. 243-267.
Raines et al., "Stabilization of the operating point of an avalanche photodetector", Journal of Physics E: Scientific Instruments 1970 vol. 3, pp. 621-623.
"Temperature-Controlled, NV, I2C, Logarithmic Resistor", MAXIM Integrated Products brochure, 2008, pp. 1-17.
"90V Boost DC/DC Converter with APD Current Monitor", Linear Technology Corporation brochure, 2006, pp. 1-12.
"How to Optimize Avalanche Photodiode (APD) Bias Range Using a DS1841 Logarithmic Resistor", MAXIM Integrated Products note, Jun. 10, 2008, pp. 1-3.
PCT Search Report & Written Opinion, RE: Application # PCT/US2010/061297; Jul. 26, 2011.

* cited by examiner

*Primary Examiner* — Dzung Tran

(57) ABSTRACT

An optical receiver includes a light receiving element such as an avalanche photodiode (APD) for converting an optical signal to an electrical photocurrent amplified by a first current gain value and a temperature sensor for measuring the temperature of the light receiving element. The optical receiver also includes a control unit configured to control a bias voltage applied to the light receiving element such that the first gain value is adjusted to a second gain value based at least in part on a predetermined relationship between the current gain, the temperature and the applied bias voltage. The second current gain value is based at least in part on one or more parameters characteristic of the optical receiver and a system in which the optical receiver is employed.

19 Claims, 5 Drawing Sheets

HIGH DYNAMIC RANGE APD OPTICAL RECEIVER FOR ANALOG APPLICATIONS

FIELD OF THE INVENTION

The present invention relates generally to optical receivers, and more particularly to an optical receiver with high dynamic range that employs an avalanche photodiode (APD) for analog applications.

BACKGROUND OF THE INVENTION

An optical receiver in which a photodetector serves as a receiver element is one of the key elements in an optical fiber transmission network. Optical receivers, in general, function to convert optical signals into electrical signals. A typical optical receiver includes a photodetector connected to the input of an amplifier (e.g., a transimpedance amplifier). The photodetector converts the optical signal it receives into an electric current, also called a photo-electric current ($I_P$), that is supplied to the amplifier. The amplifier then generates at its output a voltage that is proportional to the electric current. The photodetector is typically either an avalanche photodiode (APD) or a PIN (positive-intrinsic-negative) photodiode.

Optical receivers are used in both digital and analog applications. Analog applications generally require high linearity optical receivers, but some particular applications requires high sensitivity and high dynamic range as well. This is particularly true when the receivers are used in optical networks such as Fiber To The Home (FTTH) systems, examples of which include Passive Optical Networks (PONs) and Radio Frequency over Glass (RFoG) systems. These networks incur high optical splitting losses in order to serve a high number of customers, which makes them more cost effective. For instance, an optical receiver used in such networks, which receives upstream optical signals from Customer Premises Equipment (CPE), may need a sensitivity better than −25 dBm in order to overcome their typical 28 dB link budget requirement.

To enhance receiver sensitivity APDs are often preferred because of their superior power sensitivity in comparison to PIN photodiodes. APDs have the capability of internally multiplying the primary photocurrent by exploiting the phenomenon known as avalanche effect (impact ionization). Unfortunately, APDs also generally have relatively poor linearity. For this reason APD optical receivers are more often used in digital applications than analog applications since in digital systems sensitivity is typically more important than linearity.

Accordingly, it would be desirable to provide an optical receiver that employs an APD which is optimally biased for achieving an enhanced dynamic range and adequate linearity suitable for use in analog applications.

SUMMARY

In accordance with one aspect of the invention, an optical receiver is provided that includes a light receiving element for converting an optical signal to an electrical photocurrent amplified by a first current gain value and a temperature sensor for measuring the temperature of the light receiving element. The optical receiver also includes a control unit configured to control a bias voltage applied to the light receiving element such that the first gain value is adjusted to a second gain value based at least in part on a predetermined relationship between the current gain, the temperature and the applied bias voltage. The second current gain value is based at least in part on one or more parameters characteristic of the optical receiver and a system in which the optical receiver is employed.

In accordance with another aspect of the invention, a method is provided for converting an optical signal to an electrical signal. The method includes detecting an optical signal with a light receiving element and converting the optical signal to an electrical signal. A first bias voltage value and a first input current value applied to the light receiving element are both determined. A first value of the photocurrent generated by the light receiving element is obtained. A desired second value of the current gain is selected based at least in part on the first value of the photocurrent and one or more parameters characteristic of the optical receiver and a system in which the optical receiver is employed. A second value of the bias voltage is obtained which causes the light receiving element to impart the second value of the current gain to the optical signal. The second value of the bias voltage is applied to the light receiving element.

In accordance with yet another aspect of the invention, an optical communication network includes an optical transmitter unit for generating optical signals and at least one node for providing the optical signals to a plurality of optical network units. A first link optically couples the optical transmitter unit to the optical node. The optical node includes an optical receiver for receiving optical signals from the optical network units. The optical receiver includes a light receiving element for receiving the optical signals and a control unit configured to control a bias voltage applied to the light receiving element such that the light receiving element imparts a prescribed current gain to the optical signal based at least in part on one or more parameters characteristic of the optical receiver and the optical communication network.

DETAILED DESCRIPTION

Figure 1:
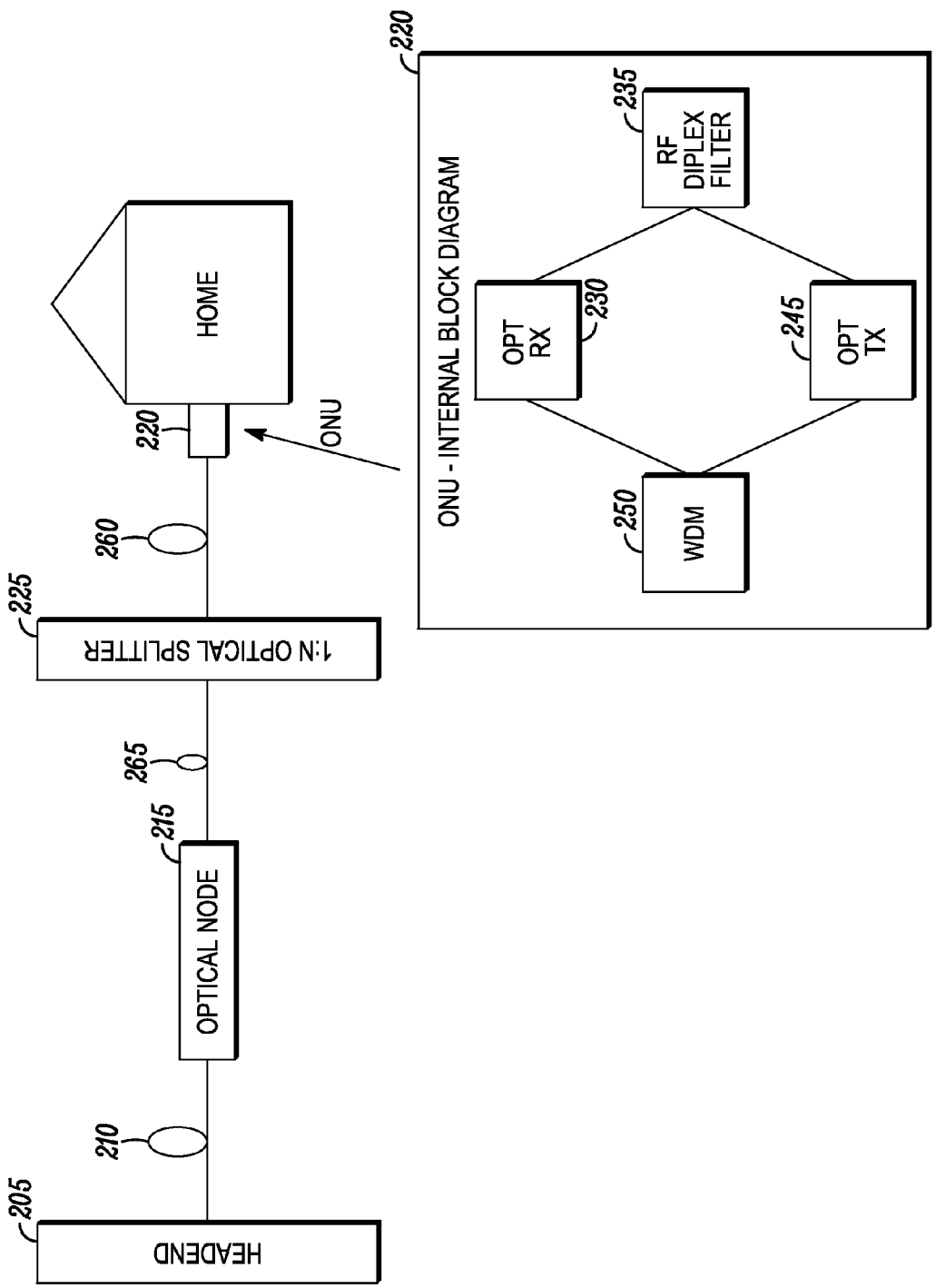
FIG. 1 shows an example of an optical communications network that may employ an analog optical receiver.

FIG. 1 shows an example of an optical communications network that may employ an analog optical receiver. While a fiber to the home (FTTH) system is shown for illustrative purposes, those of ordinary skill in the art will recognize that the network may be any type in which an optical receiver may be employed. Examples of such networks include HFC networks and passive optical networks (PONs) such as Broadband PONs and Gigabit PONs.

A fiber to the home system (FTTH) such as a Radio Frequency over Glass (RFoG) system is depicted in FIG. 1. An RFOG system provides fiber or other optical connectivity directly to the premises while using existing provisioning systems such as cable modem termination system (CMTS) platforms, headend equipment, set top boxes, conditional access technology and cable modems. A headend 205 generates and transmits optical signals downstream through fiber links, such as fiber link 210, and, optionally, to one or more optical nodes such as node 215. When present, each node may serve a different geographic region, depending on network design. The node 215 receives the downstream optical signals from the headend 205 and passively distributes these signals to optical network units (ONUs) such as ONU 220 using optical splitters such as splitter 225. The node 215 also receives upstream burst mode optical signals being transmitted by the ONU 220.

The ONU 220 is generally located on the customer premises and terminates the fiber connection and converts the downstream optical signal traffic into Radio Frequency (RF) signal traffic. The ONU contains a downstream optical receiver which receives the downstream optical signal and converts it into an electrical signal that can be used by various devices found at the home, such as a cable modem, setup box, and telephone. The ONU also contains an upstream burst mode optical transmitter which transmits information to the headend 215 from the various devices found in the home. The upstream and the downstream signals are transmitted over optical fibers 260 and 265 that link the optical node 215 and the ONU 220. More specifically, within the ONU 220 a wavelength division multiplexer (WDM) 250 separates the downstream optical signals from the upstream optical signals. The downstream optical signal is directed to an optical receiver 230 that converts the optical signals to a RF signal. A diplex filter 235 then isolates the downstream RF signals from the upstream path and provides the RF signals to the customer equipment on the premises. In the reverse or upstream path, RF signals emanating from the customer equipment are transmitted to the ONU 220. The RF signals received from the customer equipment may be digital signals, or alternatively, analog signals employing any suitable modulation scheme such as AM-VSB or Quadrature Amplitude Modulation (QAM), for example. The diplex filter 235 isolates the upstream signals from the downstream path and provides the signals to an optical transmitter 245, which converts the RF signals to optical signals so that they can be transmitted upstream via WDM 250.

In an RFoG system such as shown in FIG. 1, analog optical receivers may be employed, for instance, in the headend 205, node 215 and/or ONU 220

Figure 2:
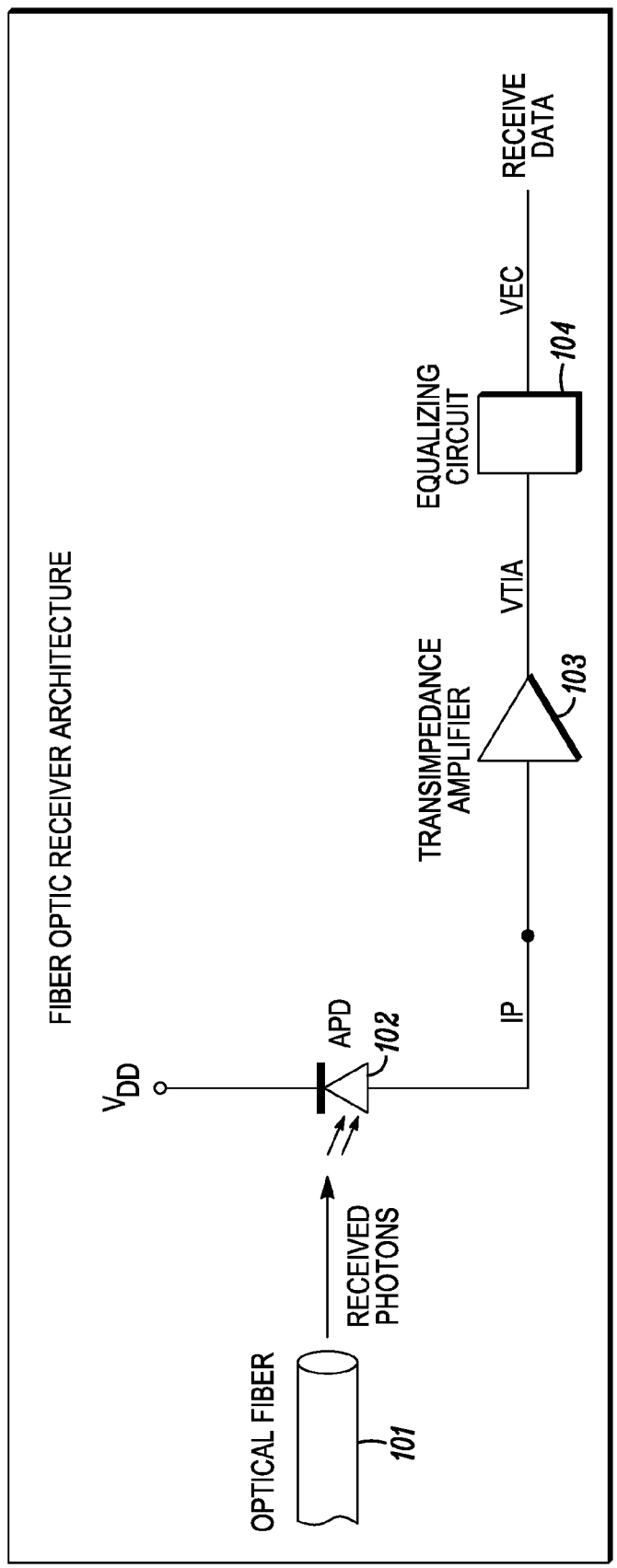
FIG. 2 is a simplified block diagram of an optical receiver.

FIG. 2 is a simplified block diagram of an optical receiver. The light from an optical fiber 101 impinges on a light receiving element such as an APD detector 102, producing a photocurrent $I_P$. The avalanche effect of the APD multiplies the primary photocurrent $I_P$ by a factor M and produces the final APD current $I_{APD}$. Transimpedance amplifier (TIA) 103 converts the relatively small current generated by the APD detector 102 into a large signal voltage, $V_{TIA}$, which may be further processed by an optional equalizing circuit 104 to produce a voltage $V_{OUT}$.

The current gain M of the APD detector 102, which is the ratio of the output APD current $I_{APD}$ from the APD detector 102 to the primary photocurrent $I_P$, is a function of both the bias voltage ($V_{APD}$) applied to the APD detector 102 and the device temperature (T) of the APD detector 102. In a conventional APD receiver the bias circuitry for the APD detector 102 controls its gain and dynamic range by compensating for changes in temperature. However, as previously noted, this and other approaches do not provide a sufficiently large dynamic range and optimum bias point to the APD for many analog applications.

The current gain M of the APD detector 102 has an optimal value for which the dynamic range of the receiver is maximized while accounting for the linearity of the optical communication system in which it is employed. This value, $M_{opt}$, can be calculated from the Noise Power Ratio (NPR) of the system, which can be expressed as:

$$NPR = \frac{S}{(N_{TH} + N_{SN} + N_{RIN} + N_{CIN}) \cdot B} \quad (1)$$

Where:
S is the signal power (A²/Hz)
$N_{TH}$ is the thermal noise (A²/Hz)
$N_S$ is the shot noise (A²/Hz)
$N_{RIN}$ is the relative intensity noise (A²/Hz)
$N_{CIN}$ is the CIN equivalent noise (A²/Hz)
CIN is the composite intermodulation noise of the system
B is the channel bandwidth (Hz)
$M_{opt}$ is the value of M for which the derivative of NPR with respect to M is zero. By performing this calculation Mopt is found to be:

$$M_{opt} \approx \frac{N_{TH}}{I_P \cdot q \cdot x + N_{CIN}} \quad (2)$$

Where: $N_{CIN} = \frac{S \cdot CIN}{B}$ $I_P$ is the primary photocurrent generated by the APD (A)
q is the electric charge (C or A/Hz)
x is the APD excess noise (dimensionless)
Except for Ip, all the remaining parameters on which $M_{opt}$ depends are characteristics of either the optical communication system or the receiver components. That is, they are fixed, system-dependent parameters.

The optimum current gain $M_{opt}$ can thus be determined by characterizing the fixed, system-dependent parameters so that they are available when the APD receiver is in use. Once these parameters are known the optimum current gain $M_{opt}$ can be determined from the above equation while the receiver is in operation by monitoring the photocurrent $I_P$.

The primary photocurrent $I_p$ can be determined from the equation $$I_P = I_{APD}/M \quad (3)$$

Where the APD current $I_{APD}$ is the measurable input current to the APD detector. Thus, to determine $I_P$, the input current $I_{APD}$ needs to be measured and the current gain M needs to be determined.

The APD current gain M can be determined by recalling that it is a function of the temperature T and the bias voltage $V_{APD}$. Accordingly, a transfer function can be empirically derived relating the current gain M to T and $V_{APD}$, which may then be stored in a memory in the form of an equation or look-up table. In this way the bias controller can measure T and $V_{APD}$ and then simply look up the value of the current gain M.

Once the current gain M is known, the photocurrent $I_P$ can be determined from equation 3 using the measured value of the input current $I_{APD}$. Given the value for the photocurrent, the value for the optimal gain $M_{opt}$ can be determined from equation 2. Finally, the bias controller can once again use the lookup table or equation relating M, T and $V_{APD}$ to determine the value of the bias voltage $V_{APD}$ necessary to produce the optimum current gain $M_{opt}$ so that this value can be applied to the APD detector 102.

Figure 3:
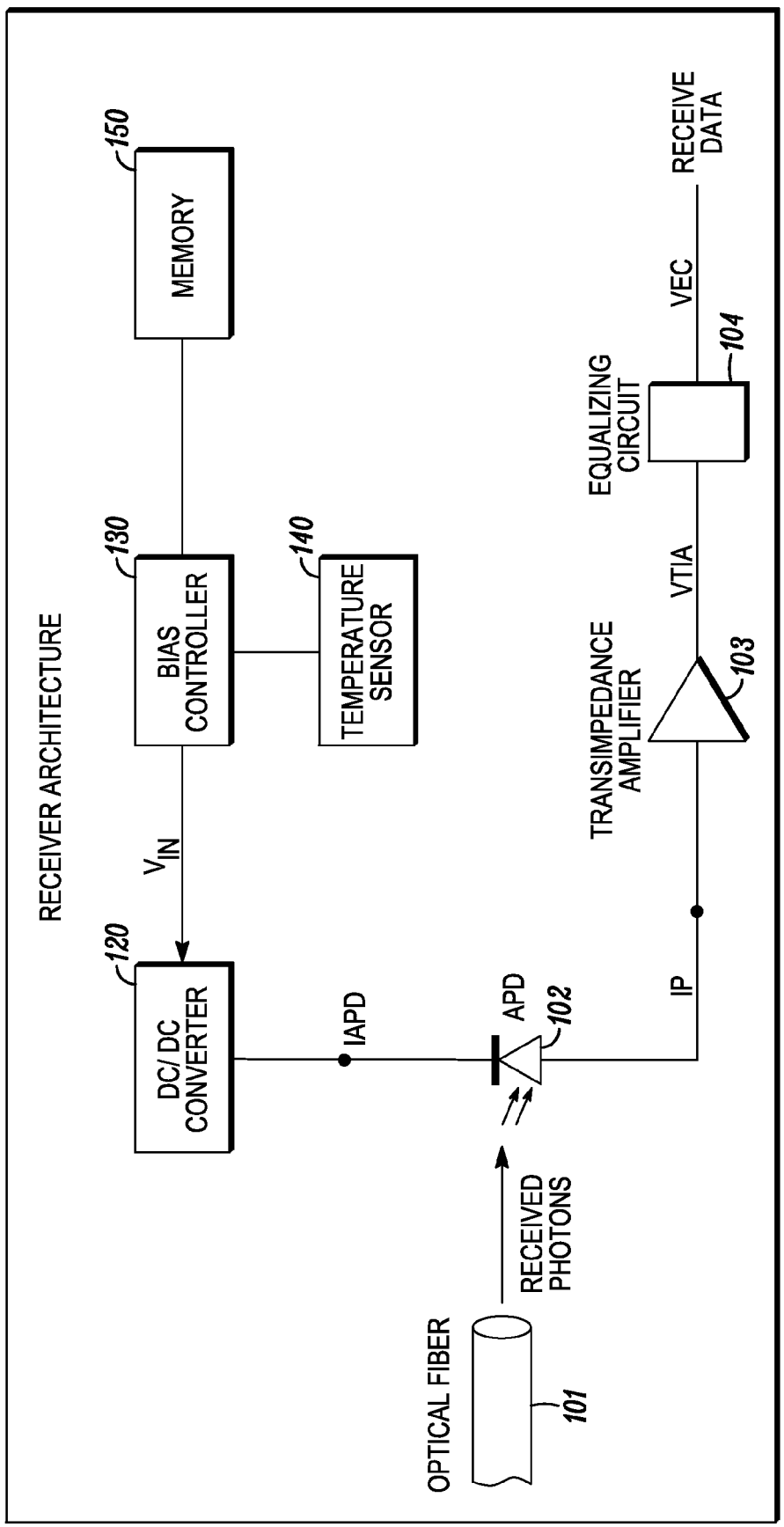
FIG. 3 is a simplified block diagram of an optical APD receiver constructed in accordance with the methods and techniques described herein.

FIG. 3 is a block diagram of an optical APD receiver constructed in accordance with the methods and techniques described herein. In FIGS. 2 and 3, as well as the figures that follow, like reference numerals denote like elements. As shown, the voltage $V_{APD}$ is applied to the APD detector 102 by a DC-to-DC converter 120 that boosts the output of the control signal $V_{in}$ from the bias controller 130, which may be any suitable type of processor or microprocessor. The bias controller 130 uses the value of the APD temperature measured by the temperature sensor 140 and the transfer function data stored in memory 150 to calculate the current gain M that the APD detector 102 is generating. As in FIG. 2, transimpedance amplifier (TIA) 103 converts the current generated by the APD detector 102 into a large signal voltage, $V_{TIA}$, which may be further processed by an optional equalizing circuit 104 to produce a voltage $V_{OUT}$.

Figure 4:
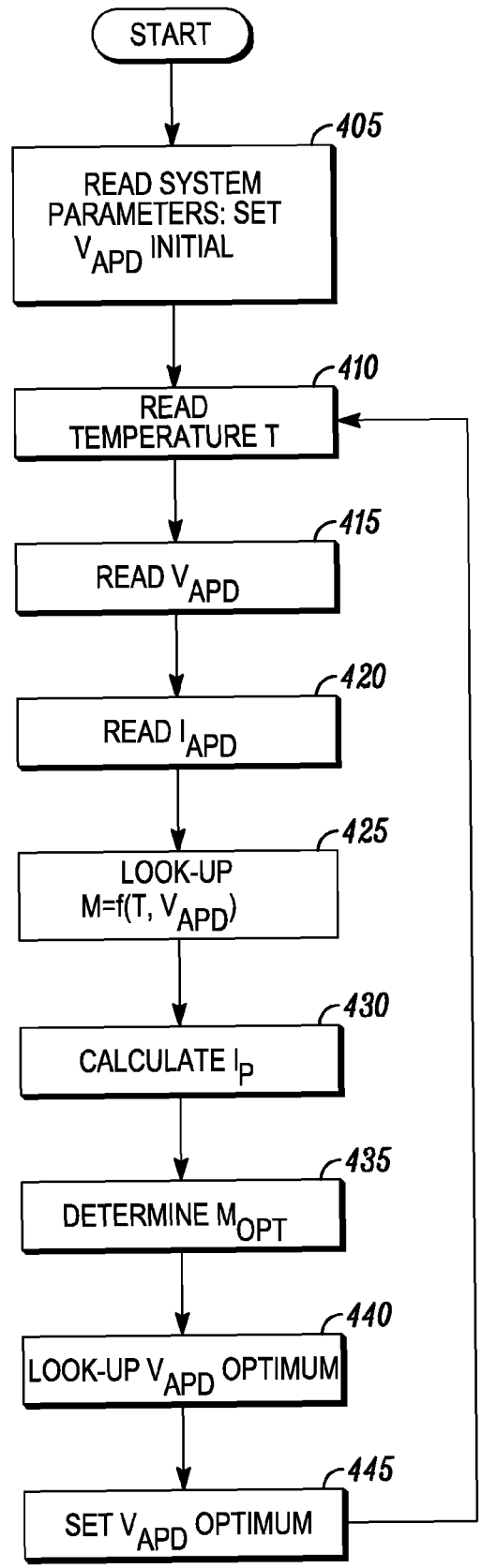
FIG. 4 is a flowchart showing one example of a process performed by the bias controller to apply the optimum current gain to the APD detector.

FIG. 4 is a flowchart showing one example of a process performed by the bias controller to apply the optimum current gain $M_{opt}$ to the APD detector 102. The method begins in step 405 where the system is initialized and the initial value of the voltage $V_{APD}$ is applied to the APD detector 102. The initial value of the voltage $V_{APD}$ may be selected in any appropriate manner and may be, for example, a pre-determined value that is stored in memory. In step 410 the bias controller 130 measures or otherwise reads the current ambient temperature as detected by temperature sensor 140. Next, the value of the voltage $V_{APD}$ is measured in step 415 and the value of the input current $I_{APD}$ to the APD detector 102 is measured in step 420. Based on these values of $V_{APD}$ and $I_{AHD}$ the value of the current gain M is determined by the bias controller 130 from the transfer function or the look-up table stored in memory 150 in step 425. Given the value of current gain M and the input current $I_M$, the photocurrent $I_P$ generated by the APD detector 102 is calculated in step 430. In addition, given the value of the system parameters that were read in step 405 and the value of photocurrent $I_P$, the optimum value of the current gain $M_{opt}$ is determined from equation 2 in step 435. The value of the voltage $V_{APD}$ needed to set the gain of the APD detector 102 to the optimum value $M_{opt}$ is next determined by the bias controller 130 in step 440 from the transfer function or the look-up table stored in memory 150. Finally, in step 445 the value of the voltage $V_{APD}$ applied to the APD detector 102 is adjusted to the value determined in step 440, thereby setting the current gain to its optimal value $M_{opt}$. The process may then return to step 410 to repeatedly adjust the voltage $V_{APD}$ as necessary to maintain the current gain at its optimal value or if the optical received power, and consequently $I_P$ has changed.

Figure 5:
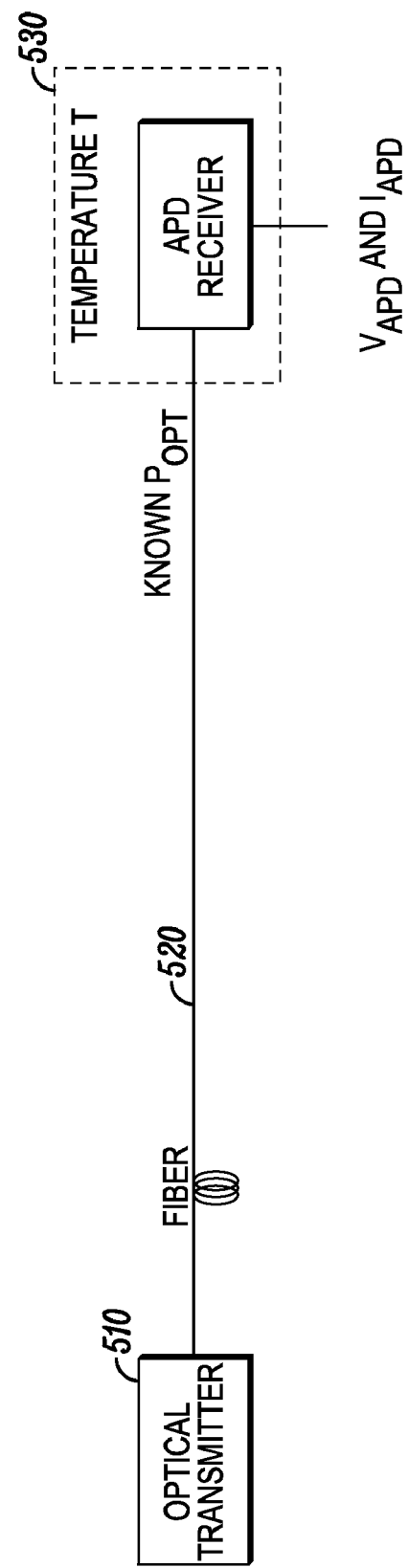
FIG. 5 shows one example of a simple arrangement that may be used to establish the relationship between the current gain M and the applied voltage $V_{APD}$.

The transfer function or look-up table relating the current gain M to the applied voltage $V_{APD}$ may be determined in any number of different ways. FIG. 5 shows one example of a simple arrangement that may be used to establish this relationship in accordance with one such technique. In this example an optical transmitter 510 delivers a known optical power $P_{in}$ over an optical fiber 520 to the optical APD receiver 530 that is being characterized. The accompanying table in FIG. 5 shows the results of the measurements that are taken for the photocurrent $I_P$, the input current $I_{APD}$ to the photodetector in the receiver 430 and the voltage $V_{APD}$ applied to the photodetector. From these values the value of the current gain M can be calculated for the single temperature (25° C.) and the varying optical powers $P_{in}$ shown in FIG. 5. This process may be repeated for a range of different temperatures to fully characterize the relationship between the temperature T, the voltage $V_{APD}$ and the current gain M for this particular optical receiver. Table 1 below shows an illustrative portion of a look-up table that may be obtained using the arrangement shown in FIG. 5 for a temperature of 25° C.

TABLE 1

| TEMP [C.] | $P_{OPT}$ [dBm] | $I_P$ [µA] | $I_{APD}$ [µA] | CURRENT GAIN [M] | $V_{APD}$ [V] |
|---|---|---|---|---|---|
| 25 | −4 | 398.11 | 94.6 | 0.24 | 8.78 |
|  | −6 | 251.19 | 94.4 | 0.38 | 8.85 |
|  | −8 | 158.49 | 93.9 | 0.59 | 9.01 |
|  | −10 | 100.00 | 79.5 | 0.80 | 13.77 |
|  | −12 | 63.10 | 64.0 | 1.01 | 18.88 |
|  | −14 | 39.81 | 48.0 | 1.21 | 24.16 |
|  | −16 | 25.12 | 36.1 | 1.44 | 28.09 |
|  | −18 | 15.85 | 26.9 | 1.70 | 31.12 |
|  | −20 | 10.00 | 20.0 | 2.00 | 33.40 |
|  | −22 | 6.31 | 15.1 | 2.39 | 35.02 |
|  | −24 | 3.98 | 11.1 | 2.79 | 36.34 |
|  | −26 | 2.51 | 8.3 | 3.30 | 37.26 |
|  | −28 | 1.58 | 6.1 | 3.85 | 37.99 |

In some implementations, instead of determining the optimal current gain $M_{opt}$ to which the APD detector is set by the bias controller in accordance with equation 2, the optimal current gain $M_{opt}$ may be determined in other ways. For instance, the optimal current gain $M_{opt}$ may be the current gain that optimizes a figure of merit such as the signal-to-noise ratio (SNR) or the modulation error rate (MER). Similar to above, this optimal current gain may be determined for different temperatures and optical power levels. Regardless of how the optimal current gain is determined, data interpolation may be used to determine the value of the bias voltage for temperatures and optical power levels other than those that have been measured.

It should be noted that in some implementations the optical receiver's dynamic range can be further extended at high optical power levels (e.g., above −3 dBm) by reducing the APD bias voltage below the APD device breakdown voltage. In this way the avalanche effect ceases to take place and the photodetector operates in a manner similar to a PIN photodetector, with enhanced linearity characteristics.

The processes described above, including but not limited to those presented in connection with FIG. 4 may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable storage medium. The instructions may also be created using source code or any other known computer-aided design tool. A computer readable storage medium may be any medium capable of carrying those instructions and include a CD-ROM, DVD, magnetic or other optical disc, tape, and silicon memory (e.g., removable, non-removable, volatile or non-volatile.

The invention claimed is:

1. An optical receiver, comprising:
a light receiving element for converting an optical signal to an electrical photocurrent amplified by a first current gain value;
a temperature sensor for measuring temperature of the light receiving element; and
a control unit configured to determine the first current gain value from the temperature and a bias voltage and to control the bias voltage applied to the light receiving element such that the first current gain value is adjusted to a second current gain value based at least in part on a predetermined relationship between the first current gain value, the temperature and the bias voltage, wherein the second current gain value is based at least in part on one or more parameters characteristic of the optical receiver and a system in which the optical receiver is employed.

2. The optical receiver of claim 1 further comprising a memory storing a transfer function relating values of the bias voltage and the temperature to current gain values generated by the light receiving element.

3. The optical receiver of claim 1 wherein the second current gain value is further based at least in part on a first value of the photocurrent when amplified by the first current gain value.

4. The optical receiver of claim 1 wherein the control unit is further configured to determine the first value of the photocurrent from the first current gain value and an input current applied to the light receiving element when the photocurrent is amplified by the first current gain value.

5. The optical receiver of claim 1 wherein the light receiving element is an avalanche photodiode (APD) and the second current gain value is an optical current gain that maximizes a dynamic range of the APD.

6. A method of converting an optical signal to an electrical signal, comprising:
   detecting an optical signal with a light receiving element;
   converting the optical signal to an electrical signal;
   determining a first bias voltage value and a first input current value applied to the light receiving element;
   determining a temperature of the light receiving element;
   determining a first value of the current gain from a predetermined relationship between the current gain, the temperature and the first bias voltage;
   determining a first value of the photocurrent generated by the light receiving element from the first value of the current gain and the first value of the input current;
   selecting a desired second value of the current gain based at least in part on the first value of the photocurrent and one or more parameters characteristic of the optical receiver and a system in which the optical receiver is employed;
   obtaining a second value of the bias voltage that causes the light receiving element to impart the second value of the current gain to the optical signal; and
   applying the second value of the bias voltage to the light receiving element.

7. The method of claim 6 wherein the desired second value of the current gain is an optimal current gain that maximizes a dynamic range of the light receiving element.

8. The method of claim 7 wherein the optimal current gain is determined based at least in part on a noise power ratio of the optical receiver and the system in which the optical receiver is employed.

9. The method of claim 7 wherein the light receiving element is an avalanche photodiode (APD).

10. The method of claim 9 wherein the first and second bias voltages are below a breakdown voltage of the APD.

11. The method of claim 6 wherein the one or more parameters characteristic of the optical receiver and the system in which the optical receiver is employed includes composite intermodulation noise arising from a transmitter and receiver in the system, a signal power received by the optical receiver from the transmitter, and a bandwidth of a channel over which is signal is transmitted.

12. The method of claim 6 wherein the light receiving element is an avalanche photodiode (APD) and the one or more parameters characteristic of the optical receiver and the system further includes APD excess noise.

13. The method of claim 6 wherein the desired second value of the current gain is an optimal current gain based at least in part on a figure of merit.

14. The method of claim 13 wherein the figure of merit is a modulation error rate.

15. An optical communication network, comprising:
   an optical transmitter unit for generating optical signals;
   at least one node for providing the optical signals to a plurality of optical network units;
   a first link optically coupling the optical transmitter unit to the optical node, wherein the optical node includes an optical receiver for receiving optical signals from the optical network units, the optical receiver including:
      a light receiving element for receiving the optical signals;
      a temperature sensor for measuring temperature of the light receiving element; and
      a control unit configured to determine a first current gain value from the temperature and a bias voltage and to control a bias voltage applied to the light receiving element such that the first current gain value is adjusted to a second current gain value based at least in part on a predetermined relationship between the first gain value, the temperature and the bias voltage, the second current gain value based at least in part on one or more parameters characteristic of the optical receiver and the optical communication network.

16. The optical communication network of claim 15 wherein the one or more parameters characteristic of the optical receiver and the optical communication network in which the optical receiver is employed includes composite intermodulation noise arising from a transmitter and receiver in the system, a signal power received by the optical receiver from the transmitter, and a bandwidth of a channel over which is signal is transmitted.

17. The optical communication network of claim 15 wherein the light receiving element is an avalanche photodiode (APD) and the one or more parameters characteristic of the optical receiver and the optical communication network further includes APD excess noise.

18. The optical communication network of claim 15 wherein the optical receiver further comprises a memory storing a transfer function relating values of the bias voltage and temperature to current gain values generated by the light receiving element.

19. The optical communication network of claim 15 wherein the light receiving element is an avalanche photodiode (APD) and the second current gain value is an optical current gain that maximizes a dynamic range of the APD.

* * * * *